(12) United States Patent
Perneti et al.

(10) Patent No.: US 12,535,968 B2
(45) Date of Patent: Jan. 27, 2026

(54) WORKLOAD PRIORITIZATION FAIRNESS TECHNIQUES IN NON-VOLATILE MEMORY EXPRESS (NVMe) SYSTEMS

(71) Applicant: DELL PRODUCTS L.P., Round Rock, TX (US)

(72) Inventors: Jayanth Kumar Reddy Perneti, Karnataka (IN); Vinay Sawal, Fremont, CA (US); Vindhya Gangaraju, Karnataka (IN)

(73) Assignee: DELL PRODUCTS L.P., Round Rock, TX (US)

( * ) Notice: Subject to any disclaimer, the term of this patent is extended or adjusted under 35 U.S.C. 154(b) by 1150 days.

(21) Appl. No.: 17/494,619

(22) Filed: Oct. 5, 2021

(65) Prior Publication Data

US 2023/0106968 A1 Apr. 6, 2023

(51) Int. Cl.
*G06F 3/06* (2006.01)
*G06N 7/01* (2023.01)

(52) U.S. Cl.
CPC .......... *G06F 3/0659* (2013.01); *G06F 3/0611* (2013.01); *G06F 3/0679* (2013.01); *G06N 7/01* (2023.01)

(58) Field of Classification Search
CPC .... G06F 3/0659; G06F 1/3296; G06F 9/4881; G06F 8/41; G06N 20/00; G06N 5/022; G06N 7/01; G06Q 10/0631; G06Q 10/06314
See application file for complete search history.

(56) References Cited

PUBLICATIONS

Niculescu-Mizil et al., "Predicting Good Probabilities With Supervised Learning," Proc. 22nd Int'l Conf. on Machine Learning (ICML 2005), Bonn, Germany, 2005, pp. 625-632 (8 pages).
Provost et al., "Tree Induction for Probability-based Ranking," Machine Learning, vol. 52, No. 3, pp. 199-215, Sep. 2003 (22 pages).
Tavakkol et al., "MQSim: A Framework for Enabling Realistic Studies of Modern Multi-Queue SSD Devices," Proc. 16th USENIX Conf. on File and Storage Technologies (FAST '18), Feb. 2018, pp. 49-65 (18 pages).
U. Johansson and P. Gabrielsson, "Are Traditional Neural Networks Well-Calibrated?," in 2019 International Joint Conference on Neural Networks (IJCNN), Budapest, Hungary, 2019, pp. 1-8, doi: 10.1109/IJCNN.2019.8852103 (8 pages).

*Primary Examiner* — Ernest Unelus
(74) *Attorney, Agent, or Firm* — BAUGH LAW, LLC

(57) ABSTRACT

Systems and methods for implementing a workload fairness policy at the data cache level within a non-volatile memory express solid-state drive utilizes a prioritization technique that predicts a degree of intensity for workloads based on a request generation rate. The degree of intensity is used to prioritize and rank workloads, thereby, avoiding interference between requests from each other.

20 Claims, 9 Drawing Sheets

200

WORKLOAD PRIORITIZATION FAIRNESS TECHNIQUES IN NON-VOLATILE MEMORY EXPRESS (NVMe) SYSTEMS

BACKGROUND

A. Technical Field

The present disclosure relates generally to information handling systems. More particularly, the present disclosure relates to workload prioritization fairness techniques in NVMe™ systems.

B. Background

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Today, the adoption of Solid State Drives (SSDs) has increased as SSDs are considered the most promising non-volatile storage devices having several advantages, such as high I/O performance, robustness, and energy efficiency, compared to traditional hard disk devices. Many modern SSDs use NAND flash memory as the underlying storage technology. In NVMe™ SSDs, multiple host-side submission queues are supported, where each workload can submit its request to a corresponding submission queue and receive a response in the completion queue. The host interface present in the SSD front-end communicates with the host and fetch requests from the submission queues, and submits responses to the completion queues. The presence of multiple submission queues improves device throughput and utilization. But there are several known shortcomings. For example, requests from concurrent workloads may cause interference at different levels within the SSD and lead to unfairness between workloads.

Accordingly, it is desirable to find new, more efficient ways to overcome the limitations of traditional designs.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may not be to scale.

DETAILED DESCRIPTION OF EMBODIMENTS

Figure 1A:
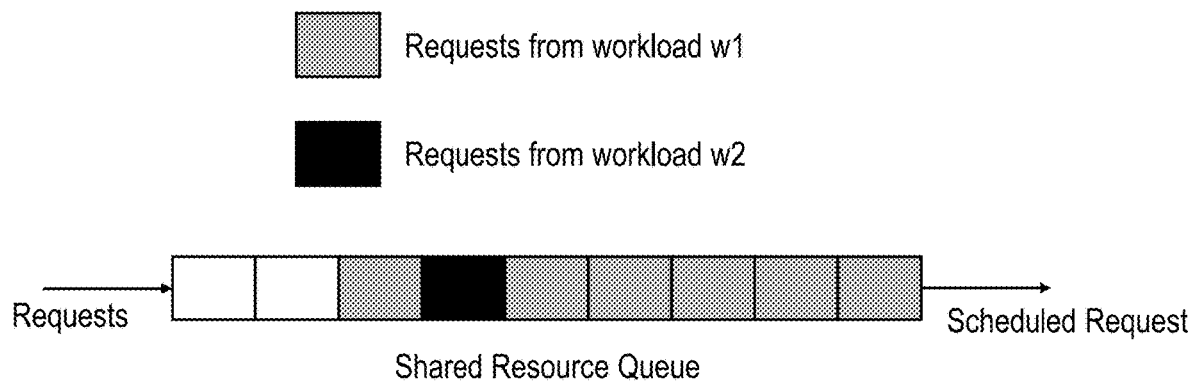
FIG. 1A depicts an example that demonstrates a fairness issue concerning two workloads.

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," "comprising," and any of their variants shall be understood to be open terms, and any examples or lists of items are provided by way of illustration and shall not be used to limit the scope of this disclosure.

A service, function, or resource is not limited to a single service, function, or resource; usage of these terms may refer to a grouping of related services, functions, or resources, which may be distributed or aggregated. The use of memory, database, information base, data store, tables, hardware, cache, and the like may be used herein to refer to system component or components into which information may be entered or otherwise recorded. The terms "data," "information," along with similar terms, may be replaced by other terminologies referring to a group of one or more bits, and may be used interchangeably. The terms "intensity" and "workload intensity" may be used interchangeably.

It shall also be noted that although embodiments herein may be described within the context of workload prioritization in SSDs, aspects of the present disclosure are not so limited. Accordingly, the aspects of the present disclosure may be applied or adapted for use in other contexts such as, for example, logic circuitry implementing fairness arbitration and related methods.

In SSD applications, requests from concurrent workloads suffer from interference at different levels within an SSD. In general, interference may be observed at two different levels, first, at the data-cache and, second, at the back-end. Interference that occurs when accessing a data cache may herein be referred to as data-cache level interference. Conversely, interference that occurs when accessing a channel, chip, die, or plane may be referred to as back-end level interference.

Due to the parallelism that is present at data-cache level being significantly lower than that at the back-end, i.e., at the channel-chip-plane-die level, the effect of an interference at the data-cache level is generally greater than at the back-end level. Workloads associated with a lower number of requests may experience a 35-fold or greater slowdown when running concurrently with workloads that have a higher number of requests due to interference at the data-cache level alone. As explained next, with reference to FIG. 1, the request generation rate of a workload may have a significant impact on interference.

FIG. 1A depicts an example that demonstrates a fairness issue concerning two different workloads. Each of two workloads, denoted as w1 and w2, is associated with a number of requests. As shown, workload w1 is associated with a higher request generation rate than workload w2. Their "shared resource queue" contains request from both workloads. As may be easily derived from FIG. 1A, the waiting time for a request by workload w2 is considerably higher than if w2 were the only workload to be processed.

In contrast, the waiting time for a request by workload w1 will not greatly differ from a scenario where w1 is the sole workload to be processed. This demonstrates that the request generation rate of a workload may play a crucial role in the interference between workloads.

In practice, the impact that a workload that generates a higher number of requests has on those that generate a relatively lower number of requests may lead to a violation of service level objectives. In addition, it raises security concerns as malicious workloads may exploit this weakness, e.g., to create a denial-of-service issues. Generally, a system is termed "fair" if concurrent workloads experience a similar degree of slowdown due to interference. Conversely, a system is termed "unfair" if the slowdown experienced by a particular workload is significantly higher than that experienced by another workload.

An existing approach for addressing interference issues between concurrent workloads caused by lack of fairness is "threshold-based" and involves systems that prioritize workloads with lower request generation rates (or low-intensity workloads). In such systems, workloads are classified into low-intensity and high-intensity categories based on whether the number of requests a workload generates is below or above a given threshold. However, such simplistic workload prioritization techniques using a binary classification lack any intelligence and have various drawbacks resulting from failing to take into consideration the degree of intensity, i.e., the number of requests generated by each workload.

Figure 1B:
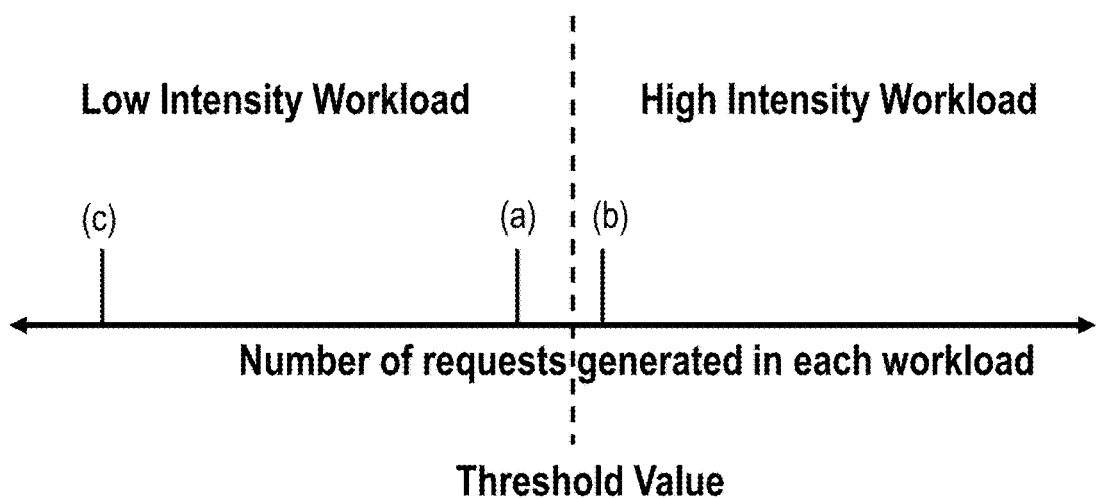
FIG. 1B illustrates an example threshold-based approach for workload prioritization.

FIG. 1B illustrates an existing threshold-based approach for workload prioritization. The number of requests generated for three exemplary workloads is plotted along a scale of arbitrary units that delineates a threshold value. As shown, the workload labeled "(a)" is categorized as a low intensity workload as it falls below the threshold value (indicated by the vertical dotted line), and the workload "(b)" is classified as a high intensity workload as it exceeds the threshold value. The difference between the number of requests generated between workload (a) and workload (b), however, is relatively low when compared to the difference in number of requests generated by the workloads (a) and (c), which, according to this threshold-based method, also happens to fall into the category of low intensity workloads. However, as can be seen in FIG. 1B, workload (c) generates a relatively lower number of requests than workload (a). As one result of this threshold-based approach failing to more clearly define the degree and/or magnitude of incoming workloads is that, even if the number of requests generated between workloads (a) and (b) is relatively low, workload (a) will ultimately enjoy the benefits of a higher priority that workload (b), which will be assigned a low priority according to the binary classification, thereby, at least partially defeating the goal of achieving fairness. Accordingly, it would be desirable to have systems and methods that overcome the limitations in existing designs that cause such undesirable results.

Therefore, in one or more embodiments, intelligent methods and systems enable a fairness control policy that achieves fairness by applying a novel prioritization technique, e.g., at the data cache level within an NVMe™ SSD. To accomplish this, various embodiments intelligently predict a degree of intensity for a workload based on the request generation rate, which has a significant impact on interference between workloads.

In one or more embodiments, the degree of intensity may be used to categorize workloads into different priority levels and rank workloads within a same priority level. Then, using the predicted intensity value, workloads may be intelligently scheduled based on their priority levels and rankings to reduce or eliminate interference between workloads (i.e., between requests from different workloads) at data cache level of an NVMe™ SSD.

Unlike existing threshold-based approaches, in one or more embodiments, a prediction mechanism may utilize a machine learning method to predict the intensity of workloads, e.g., based on the number of requests generated (request generation rate) using probabilistic prediction that can calculate a workload intensity based on predicted probabilities.

Generally, probabilistic prediction requires that probability estimates are well-calibrated, i.e., that the predicted class probabilities reflect the true, underlying probabilities to avoid misleading predictions. Therefore, one goal of probabilistic prediction is to obtain a valid predictor. Validity in this context means that the probability distributions from a predictor perform well against statistical tests based on subsequent observation of labels, the focus being on the calibration $p(c_j|p^{cj})=p^{cj}$, where $p^{cj}$ represents the probability estimates for class j.

As recent studies reveal, widely used models that provide probabilistic outputs do not always guarantee that their probability estimates will also be well-calibrated. A number of approaches exist for calibrating prediction probabilities. The most frequently used ones are "Platt scaling" and "Isotonic regression." Although both techniques are successfully applied in conjunction with different machine learning algorithms, such as support vector machines, boosted decision trees, and naïve Bayes, for single decision trees, bagged tress, and random forests, these calibration techniques are less effective. Accordingly, it would be desirable to have intelligent calibration techniques that can handle all types of underlying machine learning algorithms.

Figure 2:
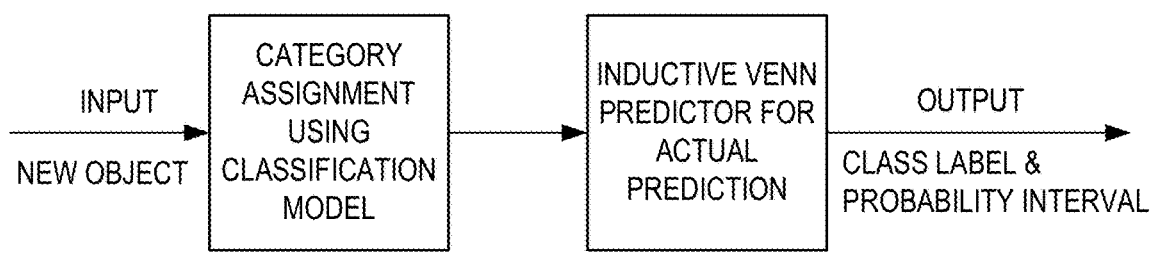
FIG. 2 depicts an exemplary prediction diagram that utilizes Venn predictors, according to embodiments of the present disclosure.

Therefore, various embodiments herein utilize a new approach to handle probabilistic predictions in a more efficient way, by using "Venn predictors" to obtain more calibrated probabilistic predictions. FIG. 2 depicts an exemplary prediction diagram that utilizes Venn predictors, according to embodiments of the present disclosure.

In the example in FIG. 2, computationally efficient "Inductive Venn predictors" are used as a machine learning framework. However, this is not intended as a limitation on the scope of the present disclosure since any calibration technique that provides well-calibrated probability estimates may equally be employed to accomplish the goals of the present disclosure.

In one or more embodiments, Venn prediction is combined with conventional classifiers to produce well-calibrated multi-probability predictions. Venn predictors are multi-probabilistic predictors with proven validity properties. Multi-probability predictions are a set of probability distributions for the true classification of a new example, i.e., one having an unknown classification. In effect, the set of probability distributions defines lower and upper bounds for the conditional probability of a new example belonging to one of the possible classes. The upper and lower bounds are guaranteed (subject to any statistical fluctuations) to contain the corresponding true conditional probabilities.

A training set, e.g., $\{z_1, \ldots, z_l\}$, where each $z_i=(x_i, y_i)$, comprises two parts, an object $x_i$ and a label $y_i$. When presented with a new object $x_{l+1}$, the aim of Venn prediction is to estimate the probability that $y_{l+1}=Y_k$ for all possible classifications $Y_k \in \{Y_1, \ldots, Y_c\}$, where c is the number of possible labels. A key idea of Venn prediction is to divide all examples into a number of categories $k_i \in K$ and use, for each label $y_k \in \{y_1, \ldots, y_c\}$, the relative frequency of examples with actual label $y_k^l$ in the category containing the object $x_{l+1}$ as the probability for that label.

The categories are defined using a Venn taxonomy, that each defines a different Venn predictor. Since the true label y+1 is not known for the object $x_{l+1}$, each of the possible labels $Y_j \in \{Y_1, \ldots, Y_c\}$ is assigned in turn to create a training set which is used to train a model.

$$\{(x_1,y_1), \ldots ,(x_l,y_l),(x_{l+1},y_j)\} \qquad \text{Eq. (1)}$$

The model is applied to the objects $x_i$, where (i=1, ..., l+1), and the predictions $\hat{Y}_i$ are used to assign $z_i$ to one of the categories $k_i \in K$.

Depending on the taxonomy, the prediction $\hat{Y}_i$ may be presented in different forms, e.g., as a class label or as a probability estimate. For each $Y_j$, the examples in Equation (1) may be assigned into a category $$K_i^{Y_j}=K((z_1, \ldots ,z_l,(x_{l+1},y_j)),z_i)), \qquad \text{Eq. (2)}$$

which may be used to calculate the empirical probabilities of each classification $Y_k$ in $K_i^{Y_j}$ using equation $$P^{Y_j}(Y_k) = \frac{|\{i = 1, \ldots , l+1 | K_i^{Y_j} = K_{l+1}^{Y_j} \wedge Y_i = Y_k\}|}{|\{i = 1, \ldots , l+1 | K_i^{Y_j} = K_{l+1}^{Y_j}\}|}. \qquad \text{Eq. (3)}$$

After assigning all possible labels $Y_j$ to object $x_{l+1}$, training new models, and calculating the empirical probabilities, a set of probability distributions may be obtained as:

$$P_{l+1}=\{P^{Y_j}:Y_j\in\{Y_1, \ldots, Y_c\}\}. \qquad \text{Eq. (4)}$$

This set of probabilities is the multi-probability prediction of the Venn predictor. The output of the Venn predictor is the prediction $$\hat{y}_{l+1}=Y_{K_{best}}, \text{ where } K_{best}=\arg\max \overline{P(Y_k)}_{k=1\ldots c} \qquad \text{Eq. (5)}$$

To determine the interval for the probability that the new object $x_{l+1}$ belongs to class $Y_k$, the maximum and minimum probabilities, $U(Y_k)$ and $L(Y_k)$, for each classification $Y_k$ among the set of probability distributions $P_{l+1}$ are obtained. The final probability interval of the prediction is $[L(Y_{K_{best}}), U(Y_{K_{best}})]$.

An "Inductive Venn Predictor" may be constructed as follows:

Labelled training examples $\{(x_1, y_1), \ldots, (x_l, y_l)\}$ are split into two parts: A training set $\{(x_1, y_1), \ldots, (x_q, y_q)\}$ for training the underlying model, and a calibration set $\{(x_q, y_q), \ldots, (x_l, y_l)\}$ for estimating label probabilities for each new test object (or example).

Typically, the taxonomy is based on the underlying model, and for each calibration and test object $x_i$, the output of the model is used to assign $(x_i, y_i)$ into one of the categories. For test instances, the category may be first determined using the underlying model, e.g., in the same way as for the calibration instances. Then, the label frequencies of the calibration instances in that category may be used to calculate the estimated label probabilities.

Figure 3:
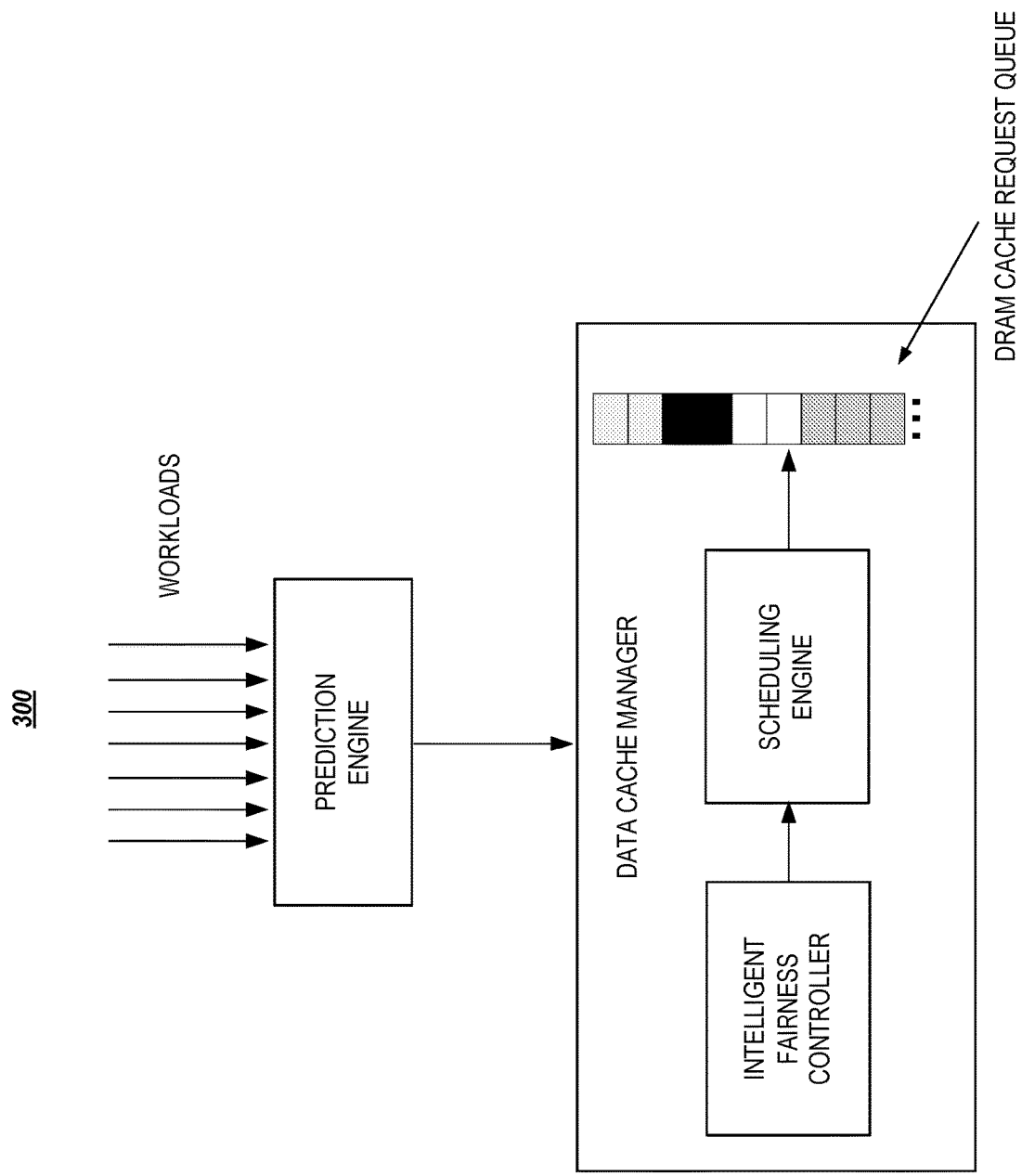
FIG. 3 depicts a system for implementing a workload fairness policy, according to embodiments of the present disclosure.

The FIG. 3 depicts a system for implementing a workload fairness policy, according to embodiments of the present disclosure. In one or more embodiments, system 300 may comprise a prediction engine and a data cache manager. As depicted in the example in FIG. 3, system 300 may further comprise an intelligent fairness controller and a scheduling engine that may be implemented in the data cache manager.

In operation, system 300 may be used to address an NVMe™ SSD fairness problem that may be viewed as a multi-class problem where workloads may be categorized into different classes, e.g., Class 0, characterized as a "low intensity" workload, i.e., one with a low request generation rate; Class 1, characterized as "medium intensity" workload, i.e., one having a medium request generation rate; and Class 2, characterized as "high intensity" workload, i.e., one associated with a high request generation rate.

In one or more embodiments, the prediction engine may have a historical dataset of request generation rates for the different workloads (e.g., along with other features and/or variables) that may be classified into one of the above-mentioned three classes, e.g., based on user-defined threshold values for the number of requests generated for each class label. Table 1 illustrates a simplified view of a historical dataset (excluding other features/variables).

TABLE 1

Simplified view of historical dataset

| Workload | Number of requests generated | Class label |
|---|---|---|
| $W_1$ | 20 | 0 |
| $W_2$ | 78 | 1 |
| $W_3$ | 300 | 2 |
| ... | ... | ... |

In one or more embodiments, the prediction engine may receive as inputs a number of workloads and perform steps such as those mentioned with reference to FIG. 2. The prediction engine may predict class labels along with a probability interval for any new incoming workload to generate prediction outputs, e.g., those illustrated in Table 2. As an example, the prediction engine may assign to workload $W_a$ class label "Class 0" and output probability interval of [0.9833, 1.000] for that prediction.

TABLE 2

Exemplary outputs of the Prediction Engine

| New Samples | Prediction output |
|---|---|
| $W_a$ | Class 0 [0.9833, 1.000] |
| $W_b$ | Class 1 [0.800, 0.9091] |
| $W_c$ | Class 2 [0. 8864, 0.8911] |
| ... | ... |

Figure 4:
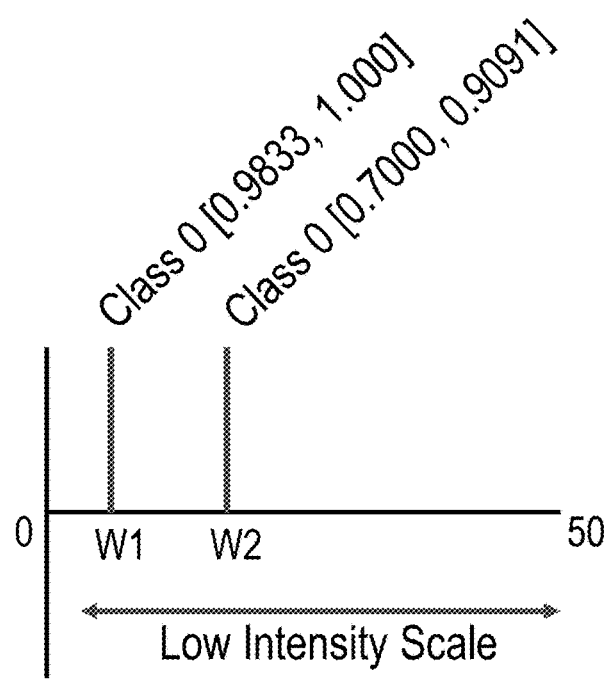
FIG. 4 is an example that illustrates predicted workloads having different degrees of intensity, according to embodiments of the present disclosure.

In one or more embodiments, the prediction engine may pass the predicted output to the intelligent fairness controller that may be implemented in data cache manager in system 300. In one or more embodiments, the intelligent fairness controller may determine priority levels for workloads, e.g., along with a degree of intensity. In one or more embodiments, the intelligent fairness controller may be used to interpret the received class labels that are assigned to the incoming samples and their intensities. For example, for the prediction output "Class 0 [0.9833, 1.000]," the incoming sample has been predicted to have a "Class 0" label associated with a "low intensity" workload. Similarly, for prediction output "Class 0 [0.7000, 0.9091]," the incoming sample has been predicted to have a "Class 0" label associated with a "low intensity." Yet, it is apparent that the latter workload has a lower degree of "low intensity" when compared to the former workload, which has a relatively greater probability interval. This is illustrated in FIG. 4, which depicts predicted workloads having different degrees of intensity. A degree of the intensity may be assigned to each incoming new sample, as illustrated in Table 3.

TABLE 3

Workload types and degrees of intensity for exemplary workloads

| New Samples | Prediction output | Predicted workload type | Degree of intensity |
|---|---|---|---|
| $W_a$ | Class 0 [0.9833, 1.000] | Low intensity | Higher degree of low intensity |
| $W_b$ | Class 0 [0.7000, 0.9091] | Low intensity | Lower degree of low intensity |
| $W_c$ | Class 1 [0.8864, 0.8911] | Medium intensity | Higher degree of medium intensity |
| $W_d$ | Class 2 [0.9910, 0.9978] | High intensity | Higher degree of high intensity |
| ... | ... | ... | ... |

In one or more embodiments, the intelligent fairness controller may output a workload priority table or similar, where each incoming workload may be assigned a priority, e.g., based on the predicted intensity of the workload. To enable fairness in the NVMe™ SSD, low intensity workloads may be given the highest priority, followed by medium intensity, and high intensity workloads.

In one or more embodiments, intelligent fairness may further comprise a more granular level of ranking of workloads within a given priority level, e.g., based on the degree of intensity, as illustrated in Table 4.

TABLE 4

Workloads assigned with final priority levels and rankings based on degree of intensity

| Workload Type | | | | | |
|---|---|---|---|---|---|
| High Intensity | | Medium Intensity | | Low Intensity | |
| Priority level | | | | | |
| P3 | | P2 | | P1 | |
| Workload | Rank | Workload | Rank | Workload | Rank |
| $W_p$ | 1 | $W_a$ | 1 | $W_x$ | 1 |
| $W_q$ | 2 | $W_b$ | 2 | $W_y$ | 2 |
| $W_r$ | 3 | $W_c$ | 3 | $W_z$ | 3 |
| ... | ... | ... | ... | ... | ... |

The output of the intelligent fairness controller may be passed to the scheduling engine that also may be implemented in the data cache manager of the NVMe™ SSD. In one or more embodiments, the scheduling engine may schedule requests from various incoming workloads based on their assigned priority levels, e.g., low intensity workloads may be given top level priority, etc. In one or more embodiments, the scheduling engine may use ranking based on degree of intensity to schedule requests from workloads having the same priority, such that top ranked workloads having the same priority may be given top preference.

Figure 5A:
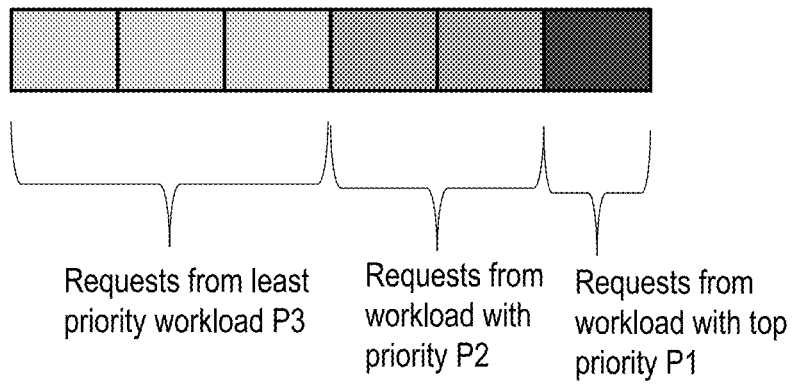
FIG. 5A depicts an exemplary reordering of requests from a workload, according to embodiments of the present disclosure.
Figure 5B:
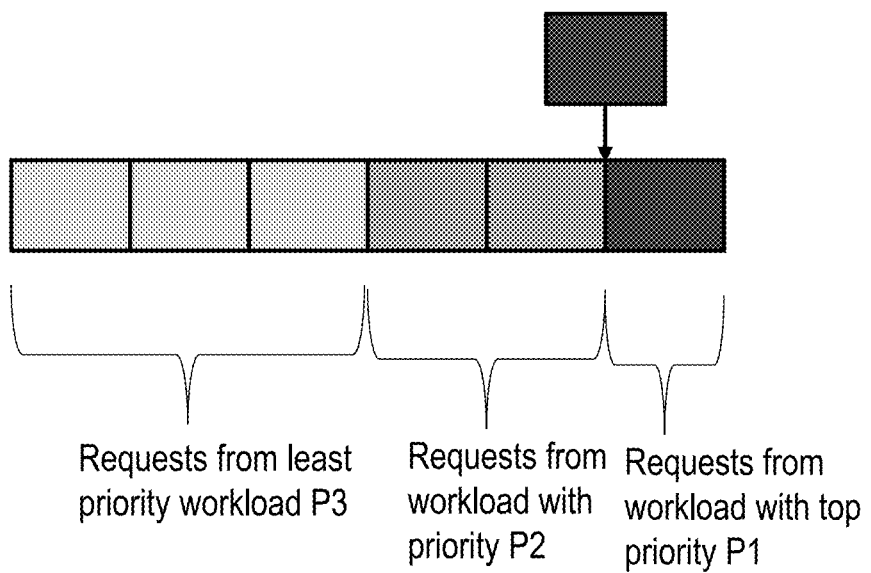
FIG. 5B depicts the insertion of a new incoming request from the workload in FIG. 5A.

FIG. 5A depicts an exemplary reordering of requests from a workload, according to embodiments of the present disclosure. A scheduling engine may reorder requests from incoming workloads, e.g., at a DRAM cache request queue. FIG. 5B depicts the insertion of a new incoming request from the same workload, i.e., after the last pending request from the same workload. In one or more embodiments, if two different workloads that have the same priority level also have the same ranking or degree of intensity, the workload with the higher cumulative priority level and/or lower service rate may be prioritized over the other one.

Figure 6:
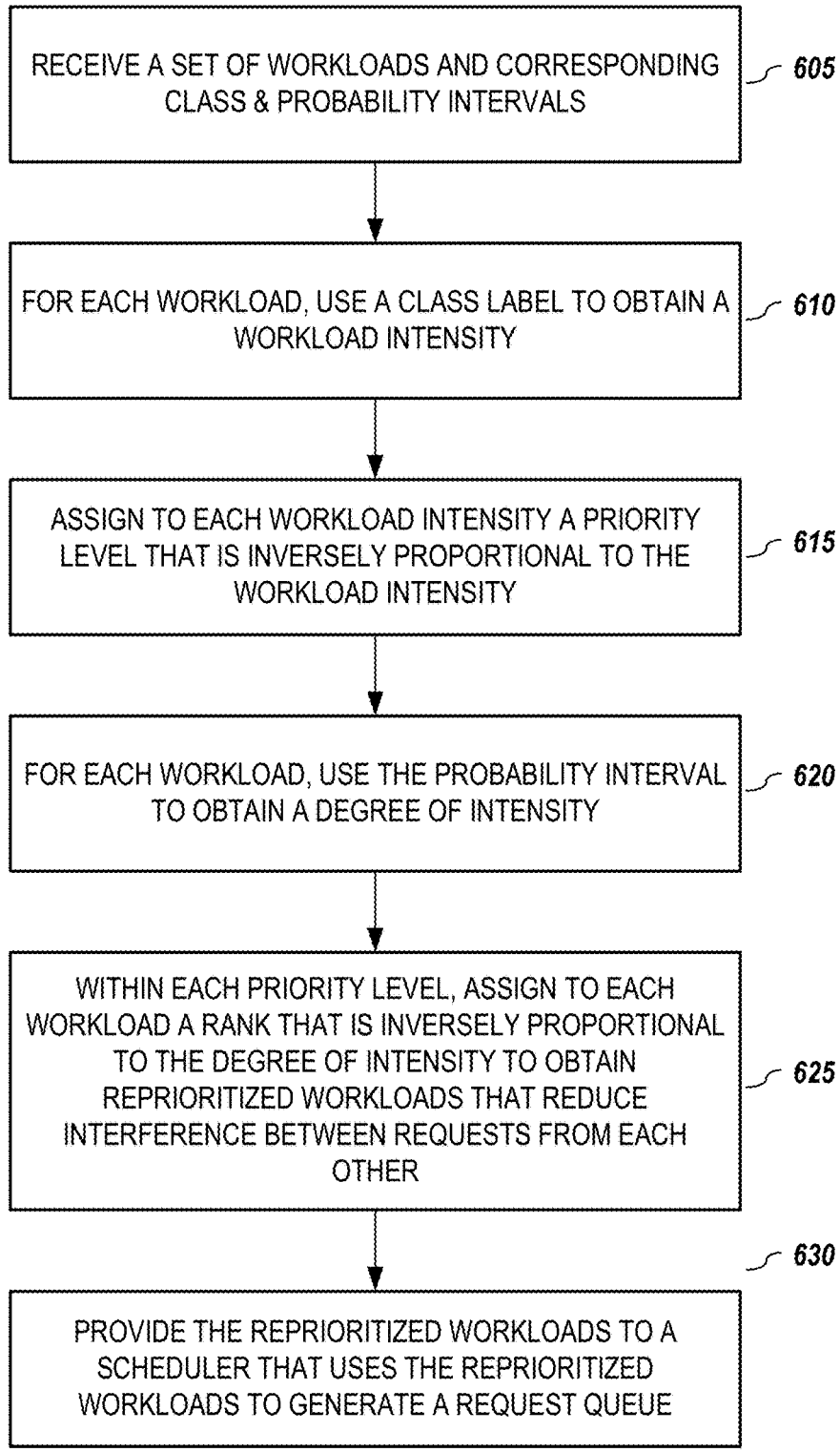
FIG. 6 is a flowchart illustrating an exemplary process for establishing a fairness policy, according to embodiments of the present disclosure.

FIG. 6 is a flowchart illustrating an exemplary process for establishing a fairness policy, according to embodiments of the present disclosure. In one or more embodiments, process 600 may begin by receiving (605) a set of workloads and corresponding class & probability intervals. For each workload, a class label may be used (610) to obtain a workload intensity. In one or more embodiments, a priority level that is inversely proportional to the workload intensity may be assigned (615) to each workload intensity. For each workload, the probability interval may be used (620) to obtain a degree of intensity, and within each priority level, a rank may be assigned (625) to each workload that is inversely proportional to the degree of intensity to obtain reprioritized workloads that reduce interference between requests from each other. Finally, the reprioritized workloads may be provided (630) to a scheduler that uses the reprioritized workloads to generate a request queue.

It shall be noted that herein (1) certain steps may optionally be performed; (2) steps may not be limited to the specific order set forth herein; (3) certain steps may be performed in different orders; and (4) certain steps may be done concurrently.

Figure 7:
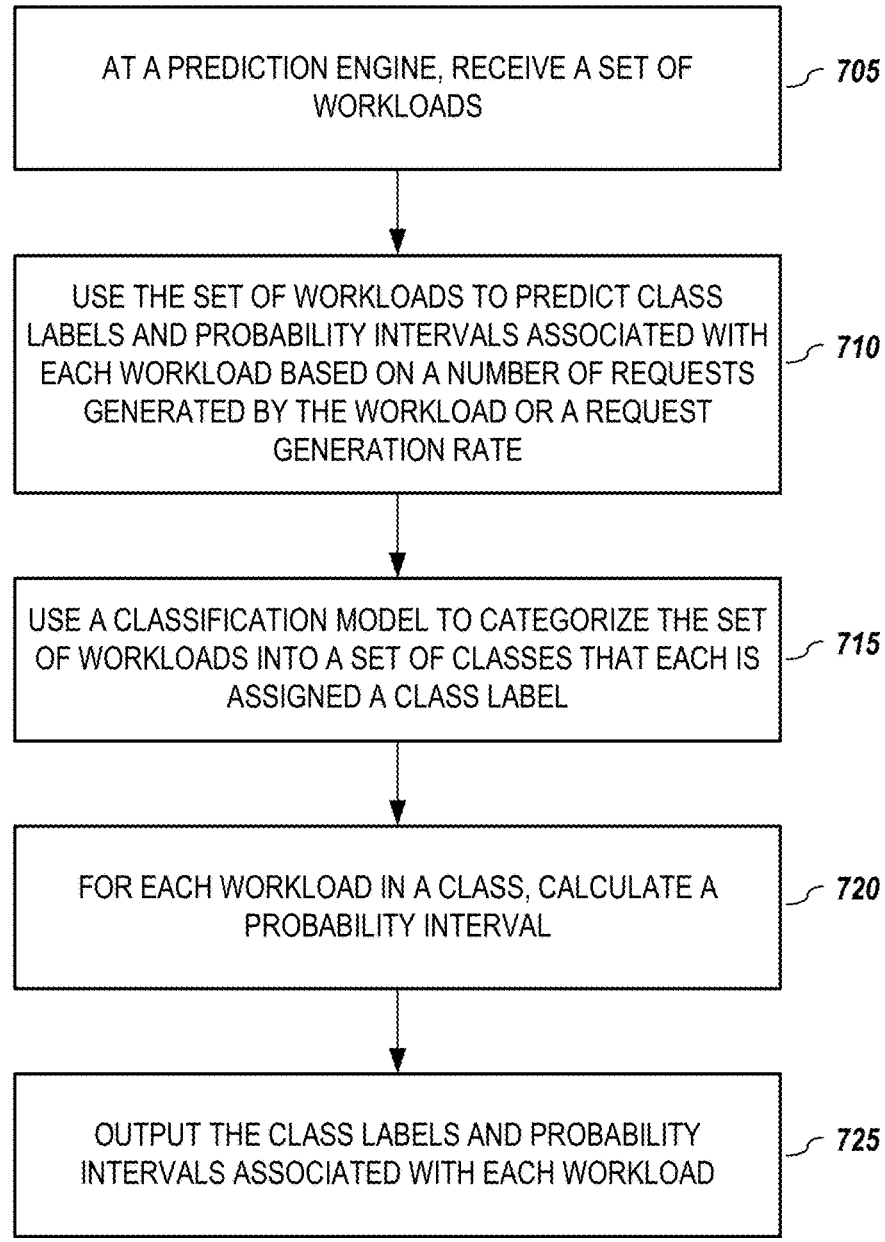
FIG. 7 is a flowchart illustrating an exemplary process for generating class labels and probability intervals for a workload fairness policy using a prediction engine, according to embodiments of the present disclosure.

FIG. 7 is a flowchart illustrating an exemplary process for generating class labels and probability intervals for a workload fairness policy using a prediction engine, according to embodiments of the present disclosure. In one or more embodiments, process 700 may begin when a prediction engine may predict (705) class labels and probability intervals associated with each workload in a set of workloads based on at least one of a number of requests generated by the workload or a request generation rate. The prediction engine may have been trained to predict class labels and associated probability intervals for workloads by using a Venn predictor, e.g., a Venn predictor uses a set of probability distributions to calculate the probability intervals.

In one or more embodiments, the prediction engine may use (710) a classification model that categorizes the set of workloads into a set of classes, each class being assigned a class label. The prediction engine may calculate (715), for each workload in a class, a probability interval. Finally, the prediction engine may generate (720) the class labels and probability intervals associated with each workload.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); and (5) an acceptable outcome has been reached.

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more drives (e.g., hard disk drives, solid state drive, or both), one or more network ports for communicating with external devices as well as various input and output (I/O) devices. The computing system may also include one or more buses operable to transmit communications between the various hardware components.

Figure 8:
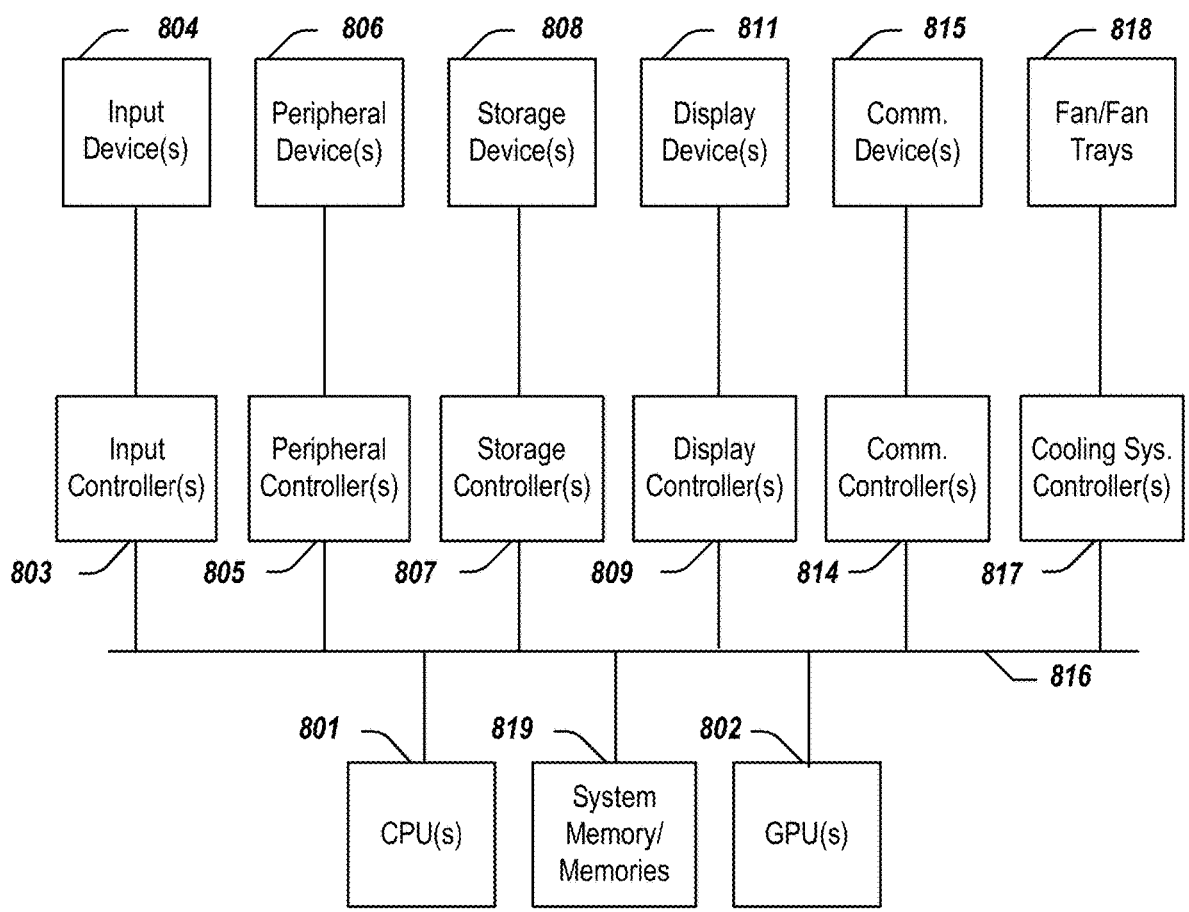
FIG. 8 depicts a simplified block diagram of an information handling system, according to embodiments of the present disclosure.

FIG. 8 depicts a simplified block diagram of an information handling system (or computing system), according to embodiments of the present disclosure. It will be understood that the functionalities shown for system 800 may operate to support various embodiments of a computing system—although it shall be understood that a computing system may be differently configured and include different components, including having fewer or more components as depicted in FIG. 8.

As illustrated in FIG. 8, the computing system 800 includes one or more CPUs 801 that provides computing resources and controls the computer. CPU 801 may be implemented with a microprocessor or the like and may also include one or more graphics processing units (GPU) 802 and/or a floating-point coprocessor for mathematical computations. In one or more embodiments, one or more GPUs 802 may be incorporated within the display controller 809, such as part of a graphics card or cards. The system 800 may also include a system memory 819, which may comprise RAM, ROM, or both.

A number of controllers and peripheral devices may also be provided, as shown in FIG. 8. An input controller 803 represents an interface to various input device(s) 804, such as a keyboard, mouse, touchscreen, stylus, microphone, camera, trackpad, display, etc. The computing system 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present disclosure. Storage device(s) 808 may also be used to store processed data or data to be processed in accordance with the disclosure. The system 800 may also include a display controller 809 for providing an interface to a display device 811, which may be a cathode ray tube (CRT) display, a thin film transistor (TFT) display, organic light-emitting diode, electroluminescent panel, plasma panel, or any other type of display. The computing system 800 may also include one or more peripheral controllers or interfaces 805 for one or more peripherals 806. Examples of peripherals may include one or more printers, scanners, input devices, output devices, sensors, and the like. A communications controller 814 may interface with one or more communication devices 815, which enables the system 800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 800 comprises one or more fans or fan trays 818 and a cooling subsystem controller or controllers 817 that monitors thermal temperature(s) of the system 800 (or components thereof) and operates the fans/fan trays 818 to help regulate the temperature.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as compact discs (CDs) and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as compact discs (CDs) and holographic devices; magneto-optical media; and hardware devices that are specially configured to store or to store and execute program code, such as ASICs, PLDs, flash memory devices, other non-volatile memory devices (such as 3D XPoint-based devices), ROM, and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize that no computing system or programming language is critical to the practice of the present disclosure. One skilled in the art will also recognize that a number of the elements described above may be physically and/or functionally separated into modules and/or sub-modules or combined together.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claim or claims may be arranged differently including having multiple dependencies, configurations, and combinations.

What is claimed is:

1. A system for implementing a workload fairness policy, the system comprising: a prediction engine that, in response to receiving a set of workloads, generates class labels and probability intervals associated with each workload;
a controller configured to, in response to receiving the set of workloads, the class labels and the probability intervals, cause operations to be performed comprising:
for each workload, using the class label to obtain a workload intensity;
assigning to each workload intensity a priority level that is inversely proportional to the workload intensity;
for each workload, using the probability interval to obtain a degree of intensity;
within each priority level, assigning to each workload a rank that is inversely proportional to the degree of intensity to obtain reprioritized workloads that reduce an interference between requests from each other; and
outputting the reprioritized workloads; and
a scheduler that uses the reprioritized workloads to generate a request queue.

2. The system of claim 1, wherein the controller is a fairness controller that is communicatively coupled between the prediction engine and the scheduler.

3. The system of claim 2, wherein the fairness controller is implemented in a data cache manager.

4. The system of claim 1, wherein the prediction engine predicts the class labels and probability intervals for each workload based on at least one of a number of requests generated by the workload or a request generation rate.

5. The system of claim 1, wherein the prediction engine uses a classification model that categorizes the set of workloads into a set of classes and calculates for each workload in a class a probability interval.

6. The system of claim 1, wherein the prediction engine has been trained to predict class labels and associated probability intervals for workloads by using a Venn predictor.

7. The system of claim 6, the Venn predictor uses a set of probability distributions to calculate the probability intervals.

8. The system of claim 1, wherein the interference between requests from two different workloads occurs at a data cache level.

9. A computer-implemented method for establishing a fairness policy, the method comprising:
  in response to receiving a set of workloads and corresponding class labels and probability intervals, performing steps comprising:
    for each workload, using a class label to obtain a workload intensity;
    assigning to each workload intensity a priority level that is inversely proportional to the workload intensity;
    for each workload, using the probability interval to obtain a degree of intensity; and
    within each priority level, assigning to each workload a rank that is inversely proportional to the degree of intensity to obtain reprioritized workloads that reduce an interference between requests from each other; and
  providing the reprioritized workloads to a scheduler that uses the reprioritized workloads to generate a request queue.

10. The computer-implemented method of claim 9, wherein a first workload having a same rank as a second workload is prioritized if it has at least one of a greater cumulative priority level and a lower service rate than the second workload.

11. The computer-implemented method of claim 9, wherein the set of workloads and corresponding class labels and probability intervals are received from a prediction engine that has been trained to predict class labels and associated probability intervals for workloads by using a Venn predictor.

12. The computer-implemented method of claim 11, wherein the Venn predictor uses a set of probability distributions to calculate the probability intervals.

13. The computer-implemented method of claim 9, wherein the interference between requests from two different workloads occurs at a data cache level.

14. A prediction engine for generating class labels and probability intervals for a workload fairness policy, the prediction engine comprising:
  an input configured to receive a set of workloads;
  one or more processors; and
  a non-transitory computer-readable medium or media comprising one or more sets of instructions which, when executed by at least one of the one or more processors, causes steps to be performed comprising:
    predicting class labels and probability intervals associated with each workload in a set of workloads based on at least one of a number of requests generated by the workload or a request generation rate;
    using a classification model that categorizes the set of workloads into a set of classes, each class being assigned a class label;
    calculating for each workload in a class a probability interval; and
    outputting the class labels and probability intervals associated with each workload that are received by a controller that in response to receiving the set of workloads, the class labels and the probability intervals, performs steps comprising:
      for each workload, using the class label to obtain a workload intensity;
      assigning to each workload intensity a priority level that is inversely proportional to the workload intensity;
      for each workload, using the probability interval to obtain a degree of intensity;
      within each priority level, assigning to each workload a rank that is inversely proportional to the degree of intensity to obtain reprioritized workloads that reduce an interference between requests from each other; and
      providing the reprioritized workloads to a scheduler that uses the reprioritized workloads to generate a request queue.

15. The prediction engine of claim 14, wherein the prediction engine has been trained to predict class labels and associated probability intervals for workloads by using a Venn predictor.

16. The prediction engine of claim 15, the Venn predictor uses a set of probability distributions to calculate the probability intervals.

17. The prediction engine of claim 15, wherein the controller is a fairness controller is communicatively coupled to the scheduler that is implemented in a data cache manager.

18. The prediction engine of claim 14, wherein the interference between requests from two different workloads occurs at a data cache level.

19. The prediction engine of claim 14, wherein an information handling system processing data according to the request queue.

20. The prediction engine of claim 19, wherein the prediction engine, the controller, and the scheduler operate on or using the information handling system.

* * * * *